(12) United States Patent
Adachi et al.

(10) Patent No.: US 10,866,411 B2
(45) Date of Patent: Dec. 15, 2020

(54) CLEANING DEVICE

(71) Applicant: FANUC CORPORATION, Yamanashi (JP)

(72) Inventors: Hideaki Adachi, Yamanashi-ken (JP); Yasuhiko Kurosumi, Yamanashi-ken (JP); Yoshihiko Tarui, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 85 days.

(21) Appl. No.: 16/373,932

(22) Filed: Apr. 3, 2019

(65) Prior Publication Data

US 2019/0310471 A1    Oct. 10, 2019

(30) Foreign Application Priority Data

Apr. 4, 2018 (JP) ................. 2018-072047

(51) Int. Cl.
| | |
|---|---|
| G02B 27/00 | (2006.01) |
| G03B 11/04 | (2006.01) |
| B23Q 17/24 | (2006.01) |
| B08B 1/04 | (2006.01) |
| B08B 1/00 | (2006.01) |

(52) U.S. Cl.
CPC ..... *G02B 27/0006* (2013.01); *B23Q 17/2409* (2013.01); *G03B 11/043* (2013.01); *B08B 1/006* (2013.01); *B08B 1/04* (2013.01)

(58) Field of Classification Search
CPC .......... B08B 1/00; B08B 1/005; B08B 1/006; B08B 1/04; B23Q 17/2409; G02B 27/0006; G03B 11/043; G03B 17/56
See application file for complete search history.

(56) References Cited

U.S. PATENT DOCUMENTS

| | | | | |
|---|---|---|---|---|
| 6,358,115 | B1 * | 3/2002 | Koike .................. | B23D 59/001 125/13.01 |
| 2002/0002885 | A1 * | 1/2002 | Luik ................... | B23Q 17/225 82/118 |
| 2002/0139394 | A1 * | 10/2002 | Bronson ............ | G02B 27/0006 134/6 |

(Continued)

FOREIGN PATENT DOCUMENTS

| | | |
|---|---|---|
| JP | 2002018680 A | 1/2002 |
| JP | 2007110665 A | 4/2007 |

(Continued)

OTHER PUBLICATIONS

English Machine Translation of Decision to Grant a Patent mailed by Japan Patent Office (JPO) for Application No. JP2018-072047, dated Jun. 23, 2020, 2 pages.

(Continued)

*Primary Examiner* — Marc Carlson
(74) *Attorney, Agent, or Firm* — Fredrikson & Byron, P.A.

(57) ABSTRACT

A cleaning device includes: a lens cover configured to cover an object lens of a camera provided in a machining area of a machine tool, the lens cover being transparent; a motor configured to rotate the lens cover; and a wiping member configured to, when the lens cover rotates, wipe at least an adhering substance that has adhered to a region of the lens cover in an angle-of-view of the camera.

4 Claims, 6 Drawing Sheets

(56) References Cited

U.S. PATENT DOCUMENTS

| | | | | |
|---|---|---|---|---|
| 2011/0181725 A1* | 7/2011 | Matsuura | ............... | G03B 17/02 |
| | | | | 348/148 |
| 2011/0265835 A1* | 11/2011 | Sato | ................. | B23Q 17/0914 |
| | | | | 134/56 R |
| 2017/0192226 A1* | 7/2017 | Eineren | ................. | G03B 17/02 |
| 2018/0246322 A1* | 8/2018 | Otomi | ...................... | B60S 1/54 |

FOREIGN PATENT DOCUMENTS

| | | | |
|---|---|---|---|
| JP | 2008288720 A | | 11/2008 |
| JP | 2010158726 A | | 7/2010 |
| JP | 2011155468 A | | 8/2011 |
| JP | 2015182656 A | * | 10/2015 |
| JP | 2015182656 A | | 10/2015 |
| JP | 201776933 A | | 4/2017 |
| JP | 2017119480 A | | 7/2017 |
| JP | 2017165287 A | | 9/2017 |

OTHER PUBLICATIONS

Untranslated Decision to Grant a Patent mailed by Japan Patent Office (JPO) for Application No. JP2018-072047, dated Jun. 23, 2020, 3 pages.

English Machine Translation of Notification of Reasons for Refusal mailed by Japan Patent Office (JPO) for Application No. JP2018-072047, dated Apr. 7, 2020, 4 pages.

Untranslated Notification of Reasons for Refusal mailed by Japan Patent Office (JPO) for Application No. JP2018-072047, dated Apr. 7, 2020, 4 pages.

English Abstract and Machine Translation for Japanese Publication No. JP2002-018680A, published Jan. 22, 2002, 17 pgs.

English Abstract and Machine Translation for Japanese Publication No. JP2007-110665A, published Apr. 26, 2007, 11 pgs.

English Abstract and Machine Translation for Japanese Publication No. JP2008-288720A, published Nov. 27, 2008, 10 pgs.

English Abstract and Machine Translation for Japanese Publication No. 2017-165287 A, published Sep. 21, 2017, 7 pgs.

English Abstract and Machine Translation for Japanese Publication No. 2015-182656 A, published Oct. 22, 2015, 11 pgs.

English Abstract and Machine Translation for Japanese Publication No. 2017-076933 A, published Apr. 20, 2017, 8 pgs.

English Abstract for Japanese Publication No. 2017119480 A, published Jul. 6, 2017, 1 pg.

English Abstract for Japanese Publication No. 2010158726 A, published Jul. 22, 2010, 1 pg.

English Abstract for Japanese Publication No. 2011155468 A, published Aug. 11, 2011, 2 pgs.

* cited by examiner

CLEANING DEVICE

CROSS-REFERENCE TO RELATED APPLICATION

This application is based upon and claims the benefit of priority from Japanese Patent Application No. 2018-072047 filed on Apr. 4, 2018, the contents of which are incorporated herein by reference.

BACKGROUND OF THE INVENTION

Field of the Invention

The present invention relates to a cleaning device that cleans a lens cover provided for preventing an adhering substance from adhering to an object lens of a camera provided in a machining area of a machine tool.

Description of the Related Art

Japanese Laid-Open Patent Publication No. 2010-158726 discloses a machine tool being provided with a camera that takes an image inside a machining area of the machine tool.

SUMMARY OF THE INVENTION

However, due to the camera taking images inside the machining area, an adhering substance such as a cutting fluid or a cutting chip ends up adhering to an object lens of the camera. As a result, there is a problem that the adhering substance ends up being photographed in an image imaged by the camera, so a clean and clear image cannot be obtained. Moreover, there is also a problem that if an amount of the adhering substance is large, a state in the machining area cannot be understood from the image obtained by imaging. Although the object lens may also conceivably be covered by a transparent lens cover in order to prevent the adhering substance from adhering to the object lens, ultimately, the adhering substance adheres to the lens cover, so the above-mentioned problems cannot be solved.

Accordingly, the present invention has an object of providing a cleaning device that removes an adhering substance adhering to a lens cover covering an object lens of a camera.

An aspect of the present invention is a cleaning device including: a lens cover configured to cover an object lens of a camera provided in a machining area of a machine tool, the lens cover being transparent; a motor configured to rotate the lens cover; and a wiping member configured to, when the lens cover rotates, wipe at least an adhering substance that has adhered to a region of the lens cover in an angle-of-view of the camera.

According to the present invention, it is possible to obtain a clear and clean image.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a cleaning device according to the present invention will be presented and described in detail below with reference to the accompanying drawings.

Embodiment

Figure 1:
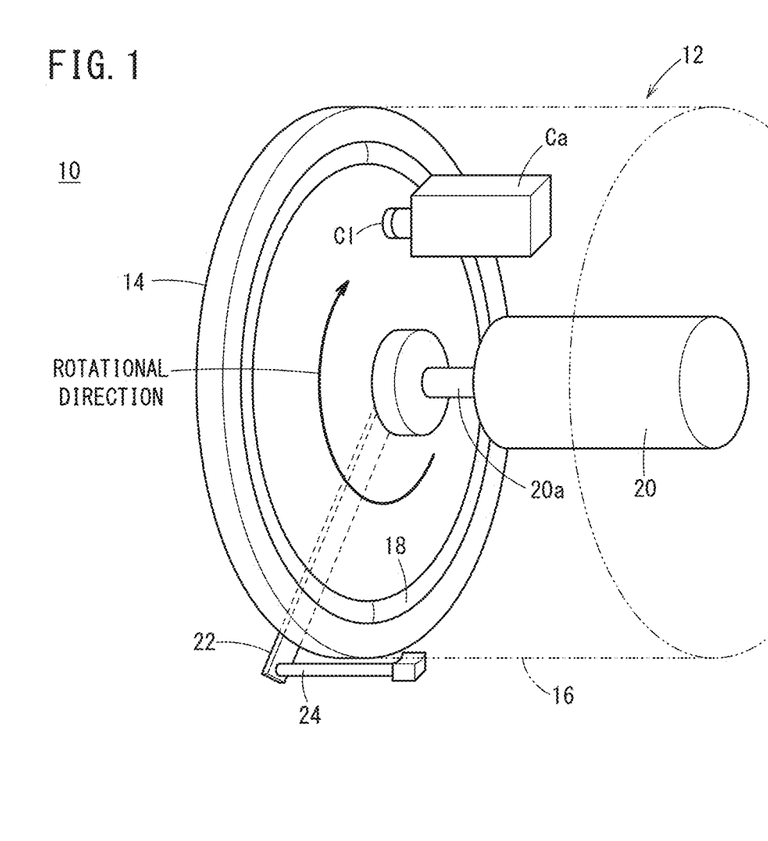
FIG. 1 is a perspective view of a cleaning mechanical unit configuring a cleaning device of the present embodiment.
Figure 2:
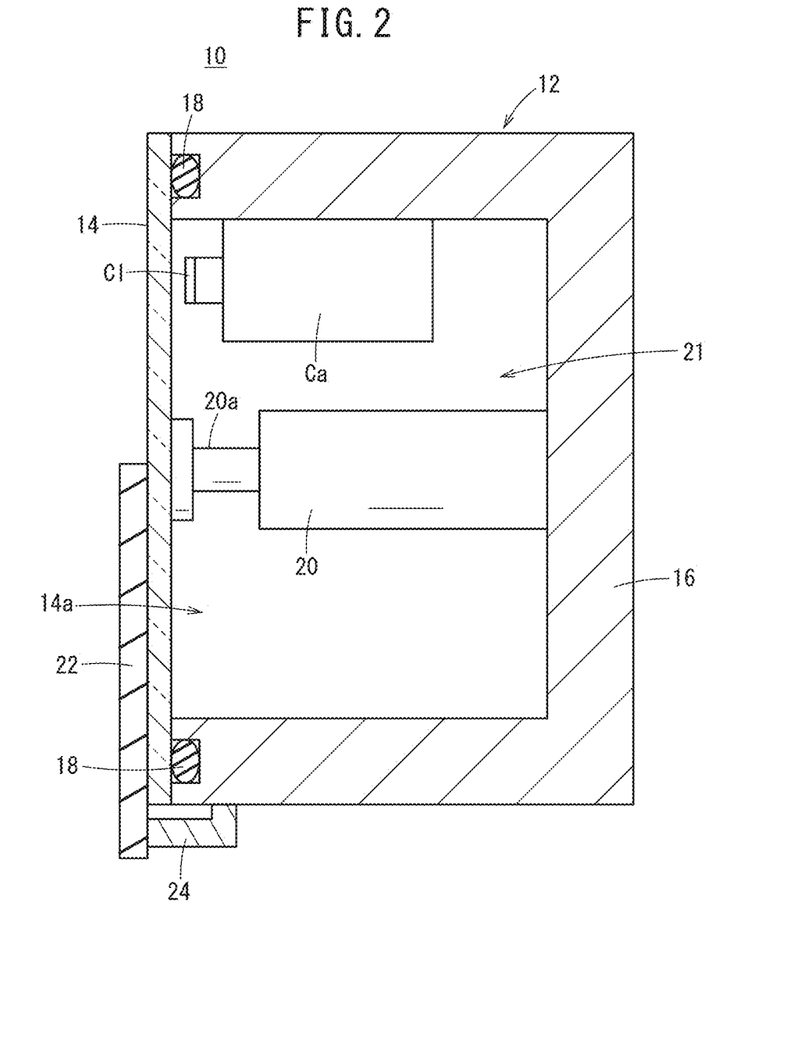
FIG. 2 is a cross-sectional view of the cleaning mechanical unit shown in FIG. 1.

FIG. 1 is a perspective view of a cleaning mechanical unit 12 configuring a cleaning device 10 of the present embodiment, and FIG. 2 is a cross-sectional view of the cleaning mechanical unit 12. The cleaning device 10 is a device that cleans a lens cover 14 provided for preventing an adhering substance (for example, a cutting fluid or a cutting chip) from adhering to an object lens Cl of a camera Ca provided in a machining area of a machine tool. In order to illustrate constituent elements provided in a housing 16 of the cleaning mechanical unit 12, the housing 16 is illustrated transparently in FIG. 1. Note that the camera Ca includes at least an imaging element and a lens (including the object lens Cl).

The cleaning mechanical unit 12 includes the lens cover 14, the housing 16, a seal member 18, a motor 20, a wiping member 22, and a bracket 24.

The housing 16 includes an opening section 14a, and houses the motor 20 and the camera Ca. In the present embodiment, the housing 16 has its cross section formed in a concave shape.

The lens cover 14 is attached to the housing 16 so as to cover the whole of the opening section 14a of the housing 16. This lens cover 14 is transparent and covers the object lens Cl of the camera Ca. In other words, the lens cover 14 is disposed so as to face the object lens Cl. The motor 20 and the camera Ca are provided in a space 21 formed by the lens cover 14 and the housing 16, and are supported by the housing 16. A radius of the circular-shaped lens cover 14 is larger than a diameter of the object lens Cl. The camera Ca is provided such that the object lens Cl is positioned between a central position of the lens cover 14 and an outer circumference of the lens cover 14.

Since the camera Ca and the motor 20 are provided in the space 21 formed by the lens cover 14 and the housing 16 in this way, the camera Ca and the motor 20 can be protected from the adhering substance. Moreover, the adhering substance can be prevented from adhering to a surface of the lens cover 14 on a camera Ca side (a back surface of the lens cover).

In order to prevent the adhering substance such as the cutting fluid and the cutting chip from infiltrating into the space 21 formed by the lens cover 14 and the housing 16, the seal member (for example, an O ring, or the like) 18 is provided between the lens cover 14 and the housing 16.

The motor 20 is a drive source rotating the lens cover 14. The lens cover 14 rotates around a rotating shaft 20a of the motor 20 by drive of the motor 20. The lens cover 14 is attached to the rotating shaft 20a of the motor 20, such that the central position of the disk-shaped lens cover 14 and a central position of the rotating shaft 20a of the motor 20 substantially coincide.

The wiping member 22 is provided so as to abut on a front surface of the lens cover 14 on an opposite side to a housing 16 side of the lens cover 14. The wiping member 22 is fixed to the housing 16 via a bracket 24. The wiping member 22 may be a wiper made of a rubber resin, for example. When the lens cover 14 rotates, the wiping member 22 wipes at least the adhering substance that has adhered to a region of the lens cover 14 in an angle-of-view of the camera Ca. Due to the lens cover 14 rotating, the wiping member 22 slides over the lens cover 14, and is thereby able to wipe at least the adhering substance that has adhered to the region of the lens cover 14 in the angle-of-view of the camera Ca. As a result, at least the adhering substance on the region of the lens cover 14 in the angle-of-view of the camera Ca is removed, and a clear and clean image can be obtained.

Note that in the present embodiment, the wiping member 22 is provided so as to abut on the lens cover 14 at least from a rotational center position of the lens cover 14 to an outer circumferential end of the lens cover 14. Hence, the wiping member 22 is able to wipe the adhering substance that has adhered to an entire surface of the lens cover 14.

Figure 3:
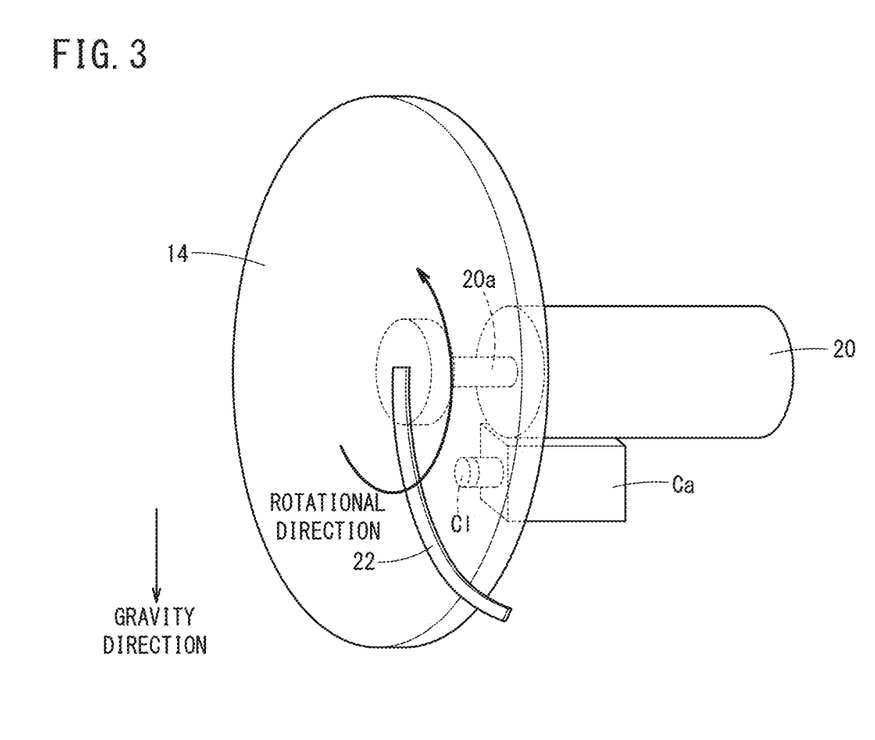
FIG. 3 is a view showing one example of a shape of a wiping member and a relative positional relationship of the wiping member and a camera, shown in FIG. 1.

FIG. 3 is a view showing one example of a shape of the wiping member 22 and a relative positional relationship of the wiping member 22 and the camera Ca. The wiping member 22 may have a shape that is crooked in an opposite direction to a rotational direction of the lens cover 14. In other words, the wiping member 22 has a shape that is bent toward the rotational direction of the lens cover 14. As a result, it becomes easier for the adhering substance that has been wiped by the wiping member 22 to move to an outer circumferential side of the lens cover 14, and the adhering substance that has adhered to the lens cover 14 can be more effectively removed.

As shown in FIG. 3, when the camera Ca is provided so as to image an object-to-be-photographed along a direction intersecting a gravity direction, the wiping member 22 may be provided more downwardly (in a gravity acting direction) than the central position of the lens cover 14. As a result, it becomes easier for the adhering substance that has been wiped by the wiping member 22 to move to the outer circumferential side of the lens cover 14 due to gravity, and the adhering substance that has adhered to the lens cover 14 can be more effectively removed.

Even if the adhering substance that has adhered to the lens cover 14 is wiped by the wiping member 22, with passage of time, the adhering substance again ends up adhering to the lens cover 14. Therefore, the camera Ca and the wiping member 22 may be disposed such that when viewed from a side facing the object lens Cl of the camera Ca, a distance between the object lens Cl and the wiping member 22 is a certain distance or less, and the object lens Cl is positioned on a rotational direction side of the wiping member 22. As a result, the camera Ca can image the object-to-be-photographed via the lens cover 14 immediately after the adhering substance has been removed, hence a more clear and clean image can be obtained.

Figure 4:
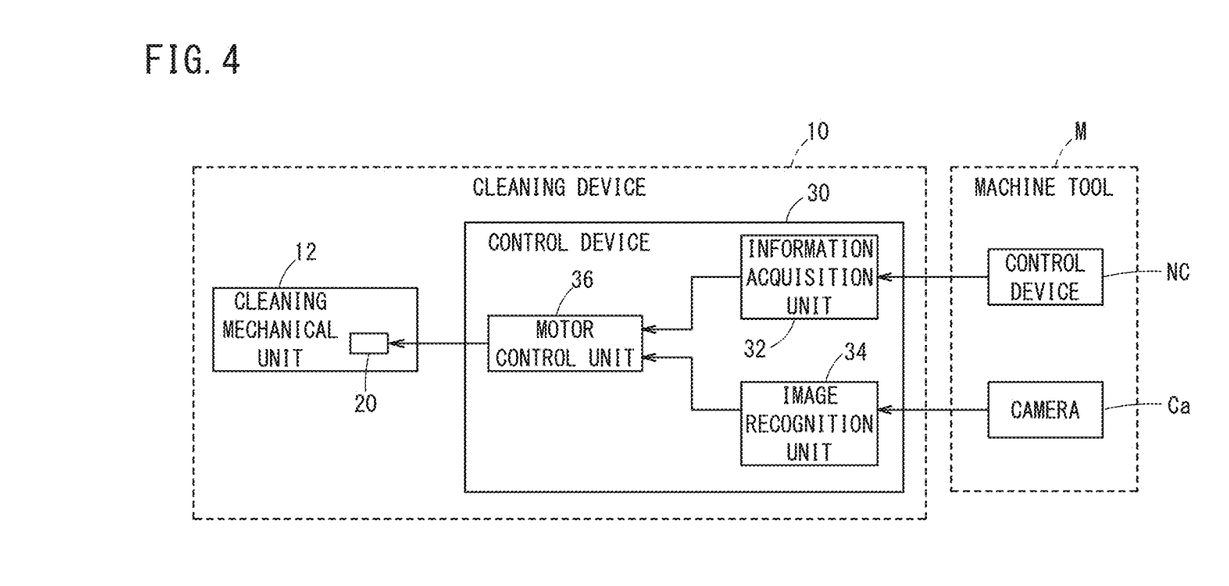
FIG. 4 is an overall configuration diagram of the cleaning device.

FIG. 4 is an overall configuration diagram of the cleaning device 10. The cleaning device 10 includes the above-mentioned cleaning mechanical unit 12 and a control device 30. The control device 30 is a computer including at least a processor such as a CPU and a memory. The control device 30 includes an information acquisition unit 32, an image recognition unit 34, and a motor control unit 36.

The information acquisition unit 32 acquires machining state information indicating a machining state of a machine tool M. The information acquisition unit 32 acquires the machining state information from a control device (for example, a numerical control device) NC of the machine tool M. As the machining state, there is included at least one of an ejection amount of a cutting fluid ejected in the machining area of the machine tool M, a spindle rotational speed of a spindle for rotating a tool, a cutting feed rate of the tool, and a cutting depth of the tool. Therefore, the machining state information acquired by the information acquisition unit 32 includes information indicating at least one of the ejection amount, the spindle rotational speed, the cutting feed rate, and the cutting depth. The information acquisition unit 32 outputs the acquired machining state information to the motor control unit 36.

There is a tendency that the larger the ejection amount is, the higher the spindle rotational speed is, the faster the cutting feed rate is, and the greater the cutting depth is, the more an amount of the adhering substance adhering to the lens cover 14 will increase. Therefore, the machining state information should include information helpful in estimating the amount of the adhering substance adhering to the lens cover 14.

The image recognition unit 34 acquires an image imaged by the camera Ca and recognizes the amount of the adhering substance that has adhered to the lens cover 14 based on the acquired image. The image recognition unit 34 can recognize an amount of the cutting fluid by recognizing the number of drops of the cutting fluid that have adhered to the lens cover 14, for example. Moreover, the image recognition unit 34 can recognize an amount of cutting chips depending on an area of the cutting chips that have adhered to the lens cover 14, for example. The image recognition unit 34 outputs the recognized amount of the adhering substance to the motor control unit 36.

The motor control unit 36 controls the rotational speed of the motor 20 (the rotational speed of the rotating shaft 20a) based on at least one of the machining state information acquired by the information acquisition unit 32 and the amount of the adhering substance recognized by the image recognition unit 34. The motor control unit 36 may control the motor 20 such that the larger the ejection amount of the cutting fluid included in the machining state information acquired by the information acquisition unit 32 is, the higher the rotational speed of the motor 20 will be. The motor control unit 36 may control the motor 20 such that the higher the spindle rotational speed included in the machining state information acquired by the information acquisition unit 32 is, the higher the rotational speed of the motor 20 will be. The motor control unit 36 may control the motor 20 such that the faster the cutting feed rate included in the machining state information acquired by the information acquisition unit 32 is, the higher the rotational speed of the motor 20 will be. The motor control unit 36 may control the motor 20 such that the greater the cutting depth included in the machining state information acquired by the information acquisition unit 32 is, the higher the rotational speed of the motor 20 will be. Since the larger the ejection amount of the cutting fluid is, the higher the spindle rotational speed is, the faster the cutting feed rate is, and the greater the cutting depth is, the more easily the amount of the adhering substance adhering to the lens cover 14 will increase, then in these cases, the rotational speed of the motor 20 is increased.

Moreover, the motor control unit 36 may control the motor 20 such that the larger the amount of the adhering substance that has adhered to the lens cover 14 recognized by the image recognition unit 34 is, the higher the rotational speed of the motor 20 will be. The higher the rotational speed of the motor 20 is, the faster the adhering substance can be wiped, and the greater the amount of the adhering substance that can be wiped will be. Note that the rotational speed of the motor 20 never wastefully increases when the amount of the adhering substance adhering to the lens cover 14 is estimated (predicted) to be small, so electric power consumption can be suppressed.

MODIFIED EXAMPLES

The above-described embodiment may also be modified as follows.

Modified Example 1

It is possible that the information acquisition unit 32, prior to the machining state of the machine tool M changing, acquires the machining state information indicating the machining state after change. In this case, it is possible that the motor control unit 36, prior to the machining state of the machine tool M changing, antecedently changes the rotational speed of the motor 20 based on the machining state information after change.

Now, when the rotational speed of the motor 20 is changed, there occurs a time lag from control for changing the rotational speed of the motor 20 being performed by the motor control unit 36 to the rotational speed of the motor 20 actually changing. Occurrence of this time lag is caused by communication equipment interposing between the motor control unit 36 and the motor 20, inertia of the rotating shaft 20a of the motor 20, rotation resistance due to friction, and so on. Therefore, if, in the case where the amount of the adhering substance adhering to the lens cover 14 will increase due to the machining state after change, control for changing the rotational speed of the motor 20 is performed after the machining state has changed, then sometimes removal of the adhering substance will be too late, and a clear and clean image will be unable to be photographed.

However, in present modified example 1, prior to the machining state of the machine tool M changing, the rotational speed of the motor 20 is antecedently changed based on the machining state information after change, so a difference (the time lag) between a timing when the machining state actually changes and a timing when the rotational speed of the motor 20 actually changes, can be reduced.

Modified Example 2

The machine tool M may be provided with a supply device for supplying compressed air or a cleaning fluid to at least one of the lens cover 14 and the wiping member 22. As a result, at least one of the lens cover 14 and the wiping member 22 can be cleaned by the compressed air or the cleaning fluid.

Modified Example 3

Although, in the above-described embodiment and modified examples 1 and 2, the case where there is one camera Ca has been described as an example, there may be a plurality of the cameras Ca. Providing a plurality of the cameras Ca makes it possible to, for example, generate a three-dimensional image from a plurality of images obtained.

Figure 5:
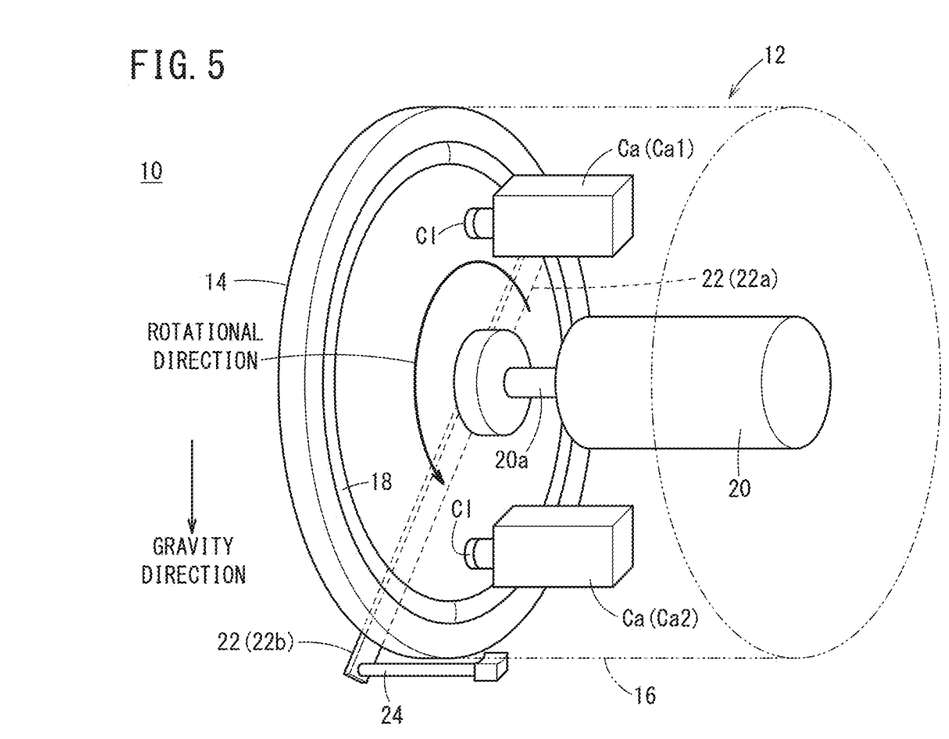
FIG. 5 is a view for describing a cleaning mechanical unit in modified example 3.

FIG. 5 is a view for describing a cleaning mechanical unit 12 in modified example 3. Note that configurations similar to in the above-described embodiment will be assigned with the same reference symbols as in the above-described embodiment, and only differing portions will be described. Note that in FIG. 5, the number of cameras Ca is assumed to be two, and that, sometimes, one of the cameras Ca will be called Ca1 and the other of the cameras Ca will be called Ca2.

As shown in FIG. 5, the lens cover 14 covers the object lenses Cl of two cameras Ca (Ca1, Ca2). In other words, the lens cover 14 is disposed so as to face the object lenses Cl of the two cameras Ca (Ca1, Ca2). The motor 20 and the two cameras Ca (Ca1, Ca2) are provided in the space 21 formed by the lens cover 14 and the housing 16.

Moreover, two of the wiping members 22 are also provided correspondingly to the two cameras Ca (Ca1, Ca2). Now, in some cases, the wiping member 22 corresponding to the camera Ca1 will be called 22a, and the wiping member 22 corresponding to the camera Ca2 will be called 22b. As described in the above-described embodiment, these two wiping members 22 (22a, 22b) may each have a shape that is crooked in an opposite direction to the rotational direction of the lens cover 14 (i.e., bent toward the rotational direction).

Moreover, the camera Ca1 and the wiping member 22a may be disposed such that when viewed from a side facing the object lens Cl, a distance between the object lens Cl of the camera Ca1 and the wiping member 22a is a certain distance or less, and the object lens Cl of the camera Ca1 is positioned on a rotational direction side of the wiping member 22a. Similarly, the camera Ca2 and the wiping member 22b may be disposed such that when viewed from a side facing the object lens Cl, a distance between the object lens Cl of the camera Ca2 and the wiping member 22b is a certain distance or less, and the object lens Cl of the camera Ca2 is positioned on a rotational direction side of the wiping member 22b.

As shown in FIG. 5, when the two cameras Ca1, Ca2 are provided so as to image an object-to-be-photographed along a direction intersecting the gravity direction, at least one of the wiping members 22 may be provided more downwardly (more in a gravity acting direction) than the central position of the lens cover 14. Moreover, the two wiping members 22 (22a, 22b) may be integrally formed.

Modified Example 4

Although in the above-described embodiment and modified examples 1 to 3, the number of cameras Ca and the number of wiping members 22 were made the same, the number of wiping members 22 may be larger than the number of cameras Ca.

Modified Example 5

Figure 6:
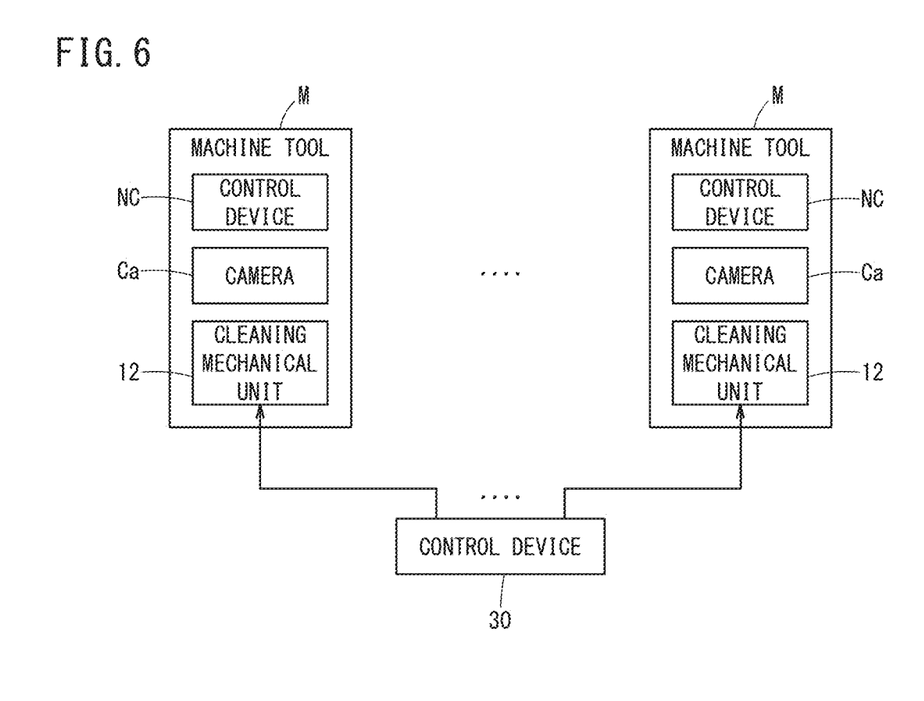
FIG. 6 is a view for describing modified example 5.

In the above-described embodiment and modified examples 1 to 4, one cleaning device 10 (cleaning mechanical unit 12 and control device 30) was provided correspondingly to one machine tool M. In the present modified example 5, as shown in FIG. 6, multiple cleaning mechanical units 12 may be provided respectively to a plurality of the machine tools M, and the control device 30 may control the plurality of cleaning mechanical units 12. In this case, it results in the cleaning device 10 being configured by the plurality of cleaning mechanical units 12 and the control device 30.

The control device 30 may change the rotational speed of the motor 20 for each of the machine tools M. In other words, since the amount of the adhering substance adhering to the lens cover 14 of the cleaning mechanical unit 12 will sometimes differ for each of the machine tools M, the rotational speed of the motor 20 may be changed for each of the machine tools M depending on the amount of the adhering substance. This amount of the adhering substance can be estimated based on the machining state information sent from the control device NC of the machine tool M and the image sent from the camera Ca provided correspondingly to the machine tool M.

Modified Example 6

Although in the above-described embodiment and modified examples 1 to 4, the control device 30 of the cleaning device 10 was provided separately from the control device NC of the machine tool M, the control device 30 of the cleaning device 10 may be the control device NC of the machine tool M.

Technical Ideas Obtained from Embodiment

Technical ideas understandable from the above-described embodiment and modified examples 1 to 6 will be described below.

The cleaning device (10) includes: a lens cover (14) configured to cover an object lens (Cl) of a camera (Ca) provided in a machining area of a machine tool (M), the lens cover being transparent; a motor (20) configured to rotate the lens cover (14); and a wiping member (22) configured to, when the lens cover (14) rotates, wipe at least an adhering substance that has adhered to a region of the lens cover (14) in an angle-of-view of the camera (Ca).

As a result, at least the adhering substance that has adhered to the region of the lens cover (14) in the angle-of-view of the camera (Ca) can be removed, so a clear and clean image can be obtained.

The cleaning device (10) may further include: a housing (16) including an opening section (14a) and configured to house the camera (Ca) and the motor (20); a seal member (18) provided between the housing (16) and the lens cover (14) covering the opening section (14a); and a bracket (24) configured to fix the wiping member (22) to the housing (16), the wiping member being provided on an opposite side to a housing (16) side of the lens cover (14). As a result, the camera (Ca) and the motor (20) can be protected from the adhering substance, and the adhering substance can be prevented from adhering to a surface of the lens cover (14) on a camera (Ca) side.

The cleaning device (10) may further include: an information acquisition unit (32) configured to acquire machining state information indicating a machining state of the machine tool (M); and a motor control unit (36) configured to control a rotational speed of the motor (20) based on the machining state information acquired by the information acquisition unit (32). The machining state may include at least one of an ejection amount of a cutting fluid ejected in the machining area, a spindle rotational speed of a spindle for rotating a tool, a cutting feed rate of the tool, and a cutting depth of the tool. As a result, even when an amount of the adhering substance adhering to the lens cover (14) increases, a larger amount of the adhering substance can be quickly removed, and a clear and clean image can be obtained. Moreover, when the amount of the adhering substance decreases, the rotational speed of the motor (20) never wastefully increases, so electric power consumption can be suppressed.

In the cleaning device, the information acquisition unit (32), prior to the machining state of the machine tool (M) changing, may acquire the machining state information indicating the machining state after change, and the motor control unit (36), prior to the machining state of the machine tool (M) changing, may antecedently change the rotational speed of the motor (20) based on the machining state information after change. As a result, a difference (a time lag) between a timing when the machining state actually changes and a timing when the rotational speed of the motor (20) actually changes, can be reduced.

The cleaning device (10) may further include: an image recognition unit (34) configured to acquire an image imaged by the camera (Ca) and thereby recognize an amount of the adhering substance that has adhered to the lens cover (14); and a motor control unit (36) configured to control a rotational speed of the motor (20) based on the amount of the adhering substance recognized by the image recognition unit (34). As a result, even when an amount of the adhering substance adhering to the lens cover (14) increases, a larger amount of the adhering substance can be quickly removed, and a clear and clean image can be obtained. Moreover, when the amount of the adhering substance decreases, the rotational speed of the motor (20) is never wastefully increased, so electric power consumption can be suppressed.

While the invention has been particularly shown and described with reference to the preferred embodiments, it will be understood that variations and modifications can be effected thereto by those skilled in the art without departing from the scope of the invention as defined by the appended claims.

What is claimed is:

1. A cleaning device comprising:
a lens cover configured to cover an object lens of a camera provided in a machining area of a machine tool, the lens cover being transparent;
a motor configured to rotate the lens cover; and
a wiping member configured to, when the lens cover rotates, wipe at least an adhering substance that has adhered to a region of the lens cover in an angle-of-view of the camera,
an information acquisition unit configured to acquire machining state information indicating a machining state of the machine tool; and
a motor control unit configured to control a rotational speed of the motor based on the machining state information acquired by the information acquisition unit,
wherein the machining state includes at least one of an ejection amount of a cutting fluid ejected in the machining area, a spindle rotational speed of a spindle for rotating a tool, a cutting feed rate of the tool, and a cutting depth of the tool.

2. The cleaning device according to claim 1, further comprising:
a housing including an opening section and configured to house the camera and the motor;
a seal member provided between the housing and the lens cover covering the opening section; and
a bracket configured to fix the wiping member to the housing, the wiping member being provided on an opposite side to a housing side of the lens cover.

3. The cleaning device according to claim 1, wherein
the information acquisition unit, prior to the machining state of the machine tool changing, acquires the machining state information indicating the machining state after change, and
the motor control unit, prior to the machining state of the machine tool changing, antecedently changes the rotational speed of the motor based on the machining state information after change.

4. The cleaning device according to claim 1, further comprising:
an image recognition unit configured to acquire an image imaged by the camera and thereby recognize an amount of the adhering substance that has adhered to the lens cover,
wherein the motor control unit is configured to control the rotational speed of the motor based on the machining state information acquired by the information acquisition unit and the amount of the adhering substance recognized by the image recognition unit.

* * * * *